Figure 1:
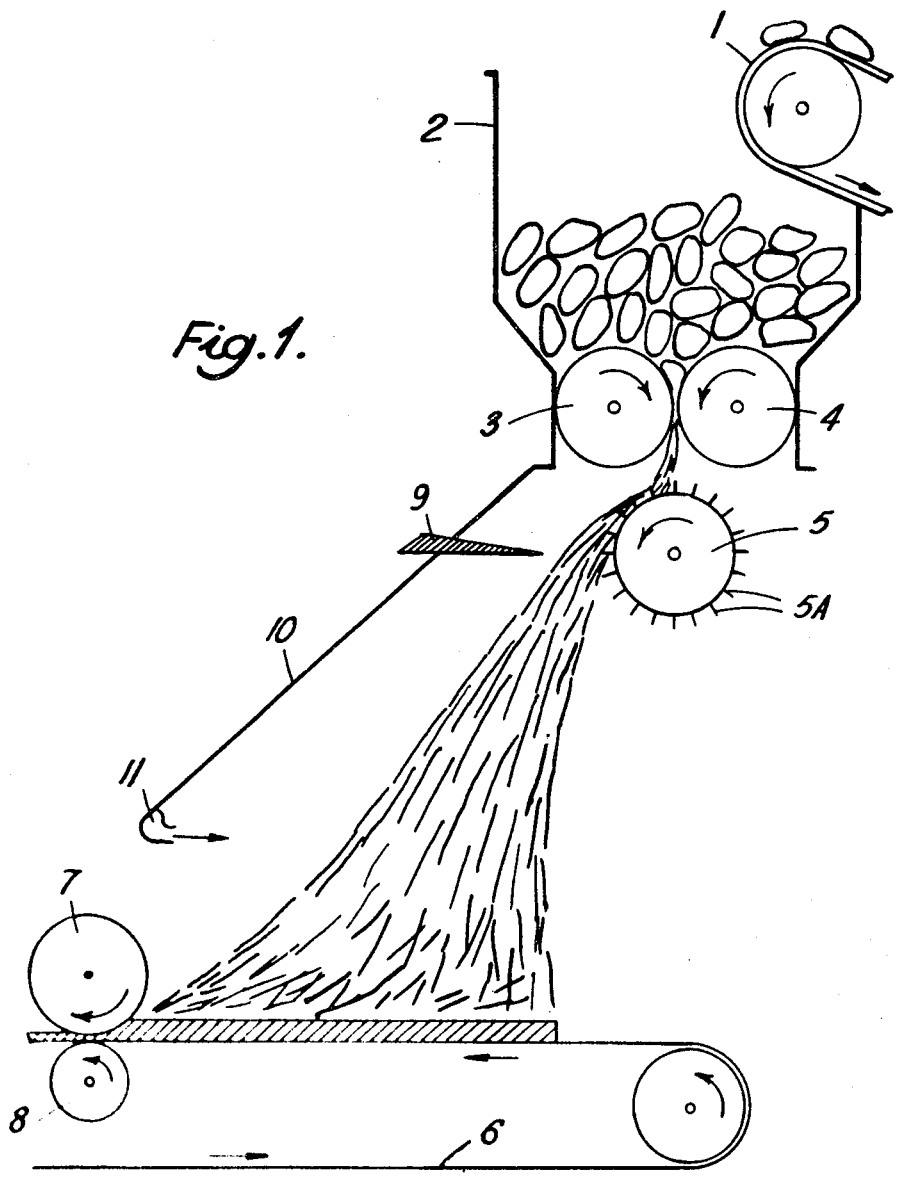

United States Patent

Schueler

[15] 3,670,063
[45] June 13, 1972

[54] PROCESS FOR THE PRODUCTION OF SHEETS HARDENABLE TO FORM MOLDED ARTICLES

[72] Inventor: George Berthold Edward Schueler, Tideswell, England

[73] Assignee: Redland Bricks Limited, Reigate, Surrey, England

[22] Filed: Sept. 8, 1969

[21] Appl. No.: 856,008

Related U.S. Application Data

[63] Continuation-in-part of Ser. No. 561,549, June 29, 1966, abandoned.

[30] Foreign Application Priority Data

July 12, 1965 Great Britain...................29,471/65
April 12, 1966 Great Britain...................15,160/66

[52] U.S. Cl..............................................264/115, 264/122
[51] Int. Cl. ........................................................B01j 2/22
[58] Field of Search..................................264/122, 115, 118

[56] References Cited

UNITED STATES PATENTS 2,544,019  3/1951  Heritage..................................264/122
3,194,859  7/1965  Wacker...................................264/122

OTHER PUBLICATIONS

Glass Reinforced Plastics, Edited by Morgan, ILIFFE Books Ltd. p. 142, 1961
Fiberglas Reinforced Plastics, by Sonneborn, Reinhold Pub. Corp., 1954.

Primary Examiner—Robert F. White
Assistant Examiner—J. R. Hall
Attorney—Young & Thompson

[57] ABSTRACT

A mouldable sheet material is formed of a substantially homogeneous mixture of finely divided inorganic material such as mineral waste dust in a proportion of at least 50 percent by weight, a hardenable resin, such as a polyester, epoxy or acrylic resin, in a proportion of not more than 30 percent by weight, and additionally a fibrous material such as glass fibers, asbestos fibers, orsisal fibers. The mixture has a dough-like consistency and is torn to a fluffy mass which is deposited on a conveyor. The fluffy mass is compacted into a sheet in which substantially all the fibers lie in the plane of the sheet but in random directions. The fluffing disperses the fibers to the extent that they can be pressed into the plane of the sheet during the compaction step.

4 Claims, 2 Drawing Figures

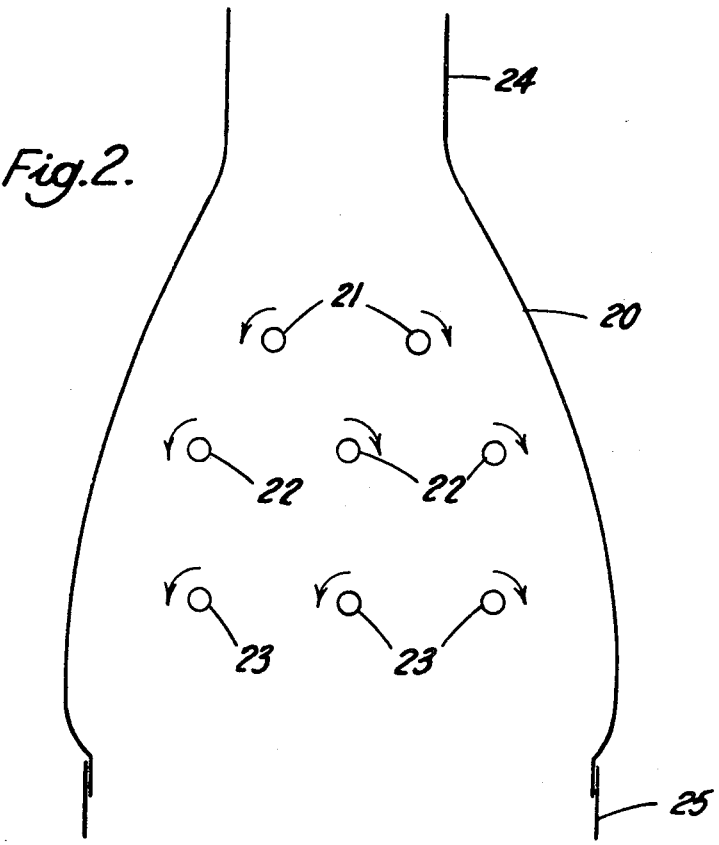

PROCESS FOR THE PRODUCTION OF SHEETS HARDENABLE TO FORM MOLDED ARTICLES

This application is a continuation-in-part of application Ser. No. 561,549 filed 29th June 1966 and now abandoned.

This invention relates to moulding materials and their preparation. The materials to which the invention relates can be used, after moulding, in, for example, the building industry and civil engineering.

Conventional materials used in building, such as bricks, cement castings and glazed ceramic pipes, are in many instances being replaced by prefabricated units assembled from materials such as light metal alloys and various plastics. The advantage of prefabricated units is that they can be mass-produced in factories and their easier handling results in a saving in building costs, in particular site labor.

Glass fibers bonded with polyester or expoxy resins are potentially useful both in the production of prefabricated building units and in the formation of articles such as pipes and tanks. However, the great disadvantage of such fibers has been the necessity of using a high proportion (e.g. 50–60 percent or even more) of resin in order to produce a product having acceptable strength and durability. If lower proportions of resin are used in glass fiber-filled mouldings the product becomes difficult to handle. Attempts to overcome this problem have involved spraying the resin onto a preformed glass fiber mat, but here there is a tendency for some fiber surfaces in the internal layers of the mat to remain inadequately coated and cause deterioration. If a moulding composition of dough-like consistency containing glass fiber and resin is used, a lower proportion of resin yields a product of insufficient strength. The product strength is of particular importance in the production of large thin-walled building sections, for example, for curtain walling. On the other hand the use of a high proportion of resin is costly, since the resin is the most expensive constituent of the material, and also large proportions of resin frequently produce an unpleasant smell, in particular when styrene monomer is used as part of the copolymer composition.

The present invention provides moulding materials having a low resin content which may be moulded and cured to give rigid products having acceptable strength properties.

Accordingly this invention provides a mouldable sheet which comprises a substantially homogeneous mixture containing at least 50 percent by weight of a finely divided inorganic material, not more than 30 percent by weight of a hardenable resin, and a fibrous material, the mixture being in the form of compacted sheet in which substantially all the fibers of the fibrous material lie in the plane of the sheet.

The resin content may be as low as 25 percent or even 17 percent by weight while still providing mouldings whose water resistance is high and whose strength may be up to 30 percent greater than that of conventional sheet materials, such as asbestos cement sheeting, of equal thickness.

The inorganic material will generally be a natural, as opposed to manufactured, material. Thus the material may conveniently be mineral waste dust, for example, dust of stone such as limestone or slate, sand, granite and the like. This results in a significant reduction in cost, since these waste dusts are readily available at very low cost, and furthermore the use of large quantities of such dusts yields a product having properties approximating to those of the original stone material from which they are derived. The finely divided material is generally of particle size 40 to 350 British Standard Mesh. Although material of up to 20 British Standard Mesh can be used if desired, sheets obtained with such materials are generally less strong and their fabrication is more difficult.

The fibrous material is usually present in the mixture in an amount not greater than 15 percent by weight preferably in an amount of from 2 to 15 percent, and more preferably from 3 to 10 percent by weight (based on the total mixture) and may be inorganic fibers, such as glass or asbestos fibers, or vegetable fibers such as sisal. Clearly the precise amount of fibrous material to be used will depend on a number of factors, such as the physical characteristics of the material (e.g. specific gravity, tensile strength etc.) and the purpose for which the sheet material is to be used (e.g. strength required, weight desired and cost considerations). The preferred amount of sisal fibers, for example, is generally 3 to 6 percent by weight. The use of these fibers can impart a slight degree of flexibility to cured mouldings obtained from sheet moulding materials. Such flexibility can be advantageous in certain cases. The preferred average length of the fibers is from 0.1 inch to 1½ inches.

The hardenable resin used may be any of the widely known unsaturated polyester, acrylic, epoxy, phenolic, amino resins or the like, certain acrylic resins being particularly useful in imparting good resistance to weathering, while epoxy resins are preferred where the strength of the product is the main criterion.

The moulding materials may be formed by any method which yields a product in which substantially all the fibers lie in the plane of the sheet. According to a further aspect of the invention there is provided a process for manufacturing a mouldable sheet material which process comprises homogeneously mixing finely divided inorganic material constituting more than 50 percent by weight of the total mixture and a hardenable resin constituting less than 30 percent by weight of the total mixture and subjecting the mixture to compaction to produce a compacted sheet in which substantially all of the fibers of the fibrous material lie in the plane of the compacted sheet.

Unless it is desired to produce a porous sheet, it is important that substantially all the air spaces are removed from between the particles during or prior to compaction. Failure to remove the occluded air will result in a weaker and less weather-resistant moulded article by rendering the adhesion between the particles and the resin less perfect.

A convenient compaction technique is to roll a "dough" of the mixture repeatedly through at least one pair of rollers. The rolling operation is usually carried out under light pressure e.g. up to 200 p.s.i. the important feature being the repeated action which forms the fibers into one plane and removes the air bubbles. The rollers may suitably be metal rollers, e.g. of 6 inch diameter, and in some instances it may be preferable to pass the sheet first between grooved rollers and then between smooth rollers. The nip between the rollers depends, naturally on the thickness desired in the final sheet, but is normally between one-sixteenth and 1 inch. The rolling will result in the removal of the air spaces initially present in the dough.

It may be desirable to interpose a film of cellophane or like material (not shown) between the rollers and the dough in order to prevent the metal rollers from picking up pieces of the dough and to facilitate subsequent handling of the rolled blanket.

Other means of compacting the dough into a sheet may be used in place of the rolling just described, for example oscillating pressure plates or extruding methods equipped with fiber orienting devices. Since the dough-like mixture before compaction may be heavy owing to the high content of inorganic material it can be difficult to handle so that it can be difficult to form the mixture into a uniform compacted sheet in which the resin evenly coats the finely divided inorganic material and fibrous material. In such a case the mixture may conveniently be formed into the compacted sheet after first subjecting it to a vigorous combing operation which separates the fibers into a fluffy mass. This mass of comparatively low density may then be compacted by passage through, for example, pairs of nip rollers, set to produce a compacted sheet of the desired thickness. By operating in this way the time spent on the compacting operation can be reduced substantially since repeated rolling of the sheet is not necessary and uniform sheets having low resin contents may be prepared in a continuous manner. This process ensures an even distribution of the resin on the fiber surfaces and the fibers remain undamaged.

Again, it may be desirable for there to be interposed between the fluffy mass and the nip rollers a sheet of cellophane or like material.

The mixture may, for example, also be formed into the compacted sheet by rolling a layer of the mixture in different directions with steel balls or by means of grooved wheels which indent the sheet and distribute the fibers.

If desired, fillers to render the product resistant to fire may be incorporated in the mixture. In any case the decreased amounts of resin in the products of this invention as opposed to prior art products reduce the fire risk, and also enable flame-retarding fillers to make up a greater proportion of a moulded product without impairing its strength. By incorporating such flame-retarding fillers it is possible to obtain products which are self-extinguishing and meet the requirements of Class 1 of British Standard Flame Spread Test (B.S. 476 part 1). Color-changing pigments can also be incorporated in the mixtures to produce a suitable color in the final product. In addition silk-screen or other patterns can be applied to the moulding material of the invention to give decorative effects.

The compacted sheet produced in accordance with this invention can be wrapped around a removable core and cured to form pipes, whose appearance, surface and properties resemble the original stone material from which the mineral material is derived. The moulding and hardening operation may be effected under contact pressure, light pressures of up to 250 p.s.i. to 300 p.s.i. The temperature of this operation will depend on the catalyst used, but will usually be in the range 60°–150b$L$ C. It is also possible to use cold-setting resins, e.g. polyesters, with appropriate catalysts when it would not be convenient to heat a moulded assembly to cure it. Such a case is in the preparation of large scale mouldings such as swimming pools. The curing time depends, inter alia, on the catalyst, curing temperature, type of filler and thickness of section, and may vary from 30 seconds, or even less, to 15 minutes, although the cure may often be continued when the product has been removed from the mould.

The remarkable strength of the hardened sheet is of particular value in such large scale mouldings, since pipes often have to be able to withstand pressures of from 60 p.s.i. up to 300 p.s.i. Conventional fiberglass pipes are usually made by spraying a resin onto a preformed glass fiber mat adding little or no mineral filler. Pipes made by the present process are usually more durable, less permeable to air or moisture, more acid-resistant and more abrasion resistant than such mat-formed fiberglass pipes. Also the large proportion of mineral dust filler (usually about 75 percent) and small proportion of resin greatly enhances their abrasion resistance — a particularly significant factor in the case of large pipes used for example in pipe lines, for whose production the present process is particularly suitable.

In some applications it is important that the unhardened sheet should have good flow properties in order to enable it to be moulded into intricate shapes, and in these uses it is often convenient to sacrifice some of the abrasion resistance for improved flow properties by using limestone dust as the finely divided inorganic filler.

A particularly valuable application of the compacted sheets formed in the present process is the moulding of hollow or filled multi-cavity sectional units for use as walls and roofing units etc. These types of sections are much used in modern techniques of building construction where load bearing structural members are clad with "curtain walling". The sections may be formed by wrapping the compacted sheet around removable mandrels, to form a hollow multi-cavity section, or by wrapping it around a core material. In either case the section may be formed into units containing for example window and door frames, since the pressure needed for the moulding operation is below 200 p.s.i. The moulding may, of course, be effected in heated dies to cause a more rapid curing of the resin using, for example, conventional veneering presses.

In the production of hollow sections from the compacted sheet of the present invention it is essential that the mandrels should be flexible or collapsible, since the resins, and in particular polyester resins, generally shrink during hardening. The hollow sections are readily transported, and when assembled into position may be left hollow, or filled with various materials. Thus the erected section may have the hollow cavities filled with sand or lightweight concrete, or to improve the sound insulating properties, a sound absorbent core material may be fed into the cavities. Likewise the cavities may be filled with fire-resistant materials to improve the fire-resisting properties of the section. The ease with which different filling materials may be inserted into the cavities of the hollow sections enables the builder to conform with the various building regulations much more readily than has hitherto been possible when using plastic building materials. A particularly valuable feature of hollow sections produced by the present invention is that they possess adequate strength even with wall thicknesses as thin as one-eighth inch for 4 by 8 feet areas.

As indicated above, the sheet may also be wrapped around a core material which is retained in the final section. Such a core may conveniently be of a foamed material, e.g. the readily available 2 inch slabs of polyurethane, equivalent in heat insulation to 9 inches of brickwork. The shrinkage of the compacted sheet which may occur during hardening is of especial significance in the production of foam cored sections, since this shrinkage tends to force the sheet mixture into the pores of the foam, and thereby supplements the chemical bond between the two materials by a mechanical bond. This ensures a very strong and permanent bond between the foam and the hardened sheet, which can greatly improve the tensile strength and creep characteristics of the section, and also the shear strength which is usually the weakest feature of the sandwich-type constructions.

A further application of the compacted sheet is to wrap it around other building materials such as woodwool cement slabs and compressed straw slabs. The hardened sheet then protects the core material against moisture, mould and fungus, while simultaneously providing it with an acceptable surface and added strength. Likewise cores of polystyrene foam or similar thermoplastic materials may be protected against excessive heat, and easily damaged cores protected against possible damage in transit.

Filled or hollow sections produced by the techniques described above are of particular utility in the production of pre-fabricated building, such as those of the modular type. With the present process sections as large as 8 by 4 feet can readily be moulded in the factory, and used in various ways apparent to a skilled architect to produce a complete house. A particular advantage of the sheets of this invention is that rendering is unnecessary, and surfacing can be added during moulding. For this type of use it is often of great value to include hot and cold water and electricity conduits in the core around which the compacted sheet is moulded, thereby producing a section which contains the basic services and merely requires connecting up.

In another valuable modification of this invention metallic reinforcement, such as wire mesh, may be incorporated into the compacted sheet, conveniently by rolling it into the basic mixture during its repeated passage through the rollers. Such a modified sheet naturally has even better strength properties than a similar unreinforced sheet, while retaining excellent cohesion as a result of the thorough and uniform penetration of the mixture into the mesh caused by the compacting operation. Alternatively metal grids may be located within the hollow cores of the sections to provide a material able to act as a load-bearing member. Also various inserts can be incorporated in the moulding materials of the invention before they are cured to act in the final cured, moulded articles as, for example, fixing means for attachment to other units.

An additional use of the compacted sheeting of this invention is the strengthening of existing walls, pillars, floors and roofs, a feature which can be of particular value in safeguarding buildings during their repair. It can also be used in the surfacing of roads, the preparation of railway tracks, and as an adhesive between two surfaces of e.g. concrete.

By combining two or more of the compacted sheets before they are hardened it is possible to produce articles which have desirable properties. For example, when two sheets having different colors are combined by laying one on top of the other and pressing the assembly cold or hot, for example at 90° C. for 5 minutes, articles can be made with the different colors on opposing faces. Thus, when moulding a window frame, two different colored sheets can be placed into a mould to give different finishes on the inside and outside of the frame. Preferably when two or more compacted sheets are combined in this way they are arranged so that the directions in which the sheets were rolled are at an angle, preferably 90°, in successive sheets. In addition to achieving different color effects it is possible, by using mixtures of different compositions, to obtain articles in which one face has different physical or chemical properties from another. Thus, when a container, tube or pipe is moulded from a double layer of sheets the inside of the moulding can be made chemically resistant, abrasion resistant or especially smooth while the outside can have different properties, for example, it can be made of cheaper materials, or be extra strong or water or weather resistant, depending on the use to which the moulding is to be put. Compacted sheets can also be joined together by butt-edging two types of sheets (or indeed the similar sheets) and then rolling the assembly and curing the resin. By this means it is possible to obtain units suitable for use as, for example, zebra crossings. By combining a number of compacted sheets a wide range of products can be made including cisterns, baths, basins, window frames, curtain walling, ceiling units, roofing, facing materials, tiles, girders, angles, channels, guttering, piping, pre-fabricated housing units, accumulator cases, dashboards and containers. Three-layer or "sandwich" mouldings can be made in which, for example, the internal layer is made of low cost material and the two facing layers can be made thin of more expensive materials. When it is desired to incorporate metal or other reinforcement this can conveniently be done by placing a reinforcing layer, for example a metal grid, between two compacted sheets and then moulding the assembly. Desirable surface effects can be created by incorporating, for example, color-changing substances and texturing agents in the sheets, or in their surfaces, for instance, pebbles as a finish for wall units, before they are hardened.

One form of apparatus suitable for handling the dough-like mixture of resin, finely divided inorganic material and fibrous material and forming it into a compacted sheet comprises a mixing device, and means for feeding the mixture from the mixing device to a rotor, or series of rotors, adapted to tear at the mixture and so form a fluffy mass consisting of loose fibers and small lumps of mineral particles all coated with resin. Collecting means are also provided suitably an endless belt or drum, adapted to receive the fluffy mass from the rotor, or series of rotors. Compacting means are adapted to receive the fluffy mass from the collecting means and to form the fluffy mass into a compacted sheet consisting of a kind of "blanket" in which substantially all the fibers lie in the plane of the sheet but in random directions.

The precise design of the tearing means will vary according to the circumstances of each individual case and the ingredients used.

The tearing means may be merely a kibbler consisting of a single shaft provided with teeth and adapted to rotate at fairly high speed.

A knife edge, adjustable in position, may be provided additionally, to control the tearing action of the rotor by varying the distance between it and the rotor.

Alternatively, the tearing means may be in the form of a kibbler consisting of a series of rotatable shafts each formed with teeth which are long in relation to the diameter of the shaft.

The tearing means desirably performs the dual functions of breaking up the material fed in from the mixer, into the fluffy mass, and also of controlling the layering of the aerated and disintegrated material. The tearing rotors will generally also act as an additional mixer. Thus, a mottled effect in the resultant sheet may be created by simultaneously feeding two or more different mixed raw materials to the tearing rotors, thereby producing a blanket having a random distribution of the different feeds.

It may be desirable for the rotors to be contained in a chamber. The upper end of such a chamber desirably contains appertures for receiving the feed of mixed materials, while the lower end of the chamber may be in the form of a skirt finishing just above the collecting means. The precise shape of the skirt can effect the distribution of the fluffed up material as it falls onto the collecting means, and an adjustable skirt may therefore be desirable, especially in regulating the distribution at the edges of the blanket.

Another method of controlling the distribution of the mixed materials may be to incorporate a baffle prior to the feed coming in contact with the tearing means. The baffle, which may be conical, could be used to control the direction of the mix. Such a baffle may therefore be used if an undulating form is required.

This apparatus for carrying out the method will now be described more fully by reference to the accompanying drawings, in which FIG. 1 is a vertical section through the apparatus, and FIG. 2 is a view of another embodiment of tearing means, alternative to that shown in FIG. 1.

Referring to the drawings, and first to FIG. 1 thereof, the apparatus comprises a conveyor 1 which in operation feeds the mixture from the mixing device (not shown) to a hopper 2. Towards the outlet end of the hopper is provided a pair of inwardly rotating rollers 3,4, adapted to feed the mixture to a rotor 5 provided with teeth 5A. An endless belt 6 collects the fluffed-out, less dense mixture from the rotor 5 and feeds it to a pair of nip rollers 7,8. A knife blade 9 may be provided to control the tearing action of the rotor teeth and is adjustable in position. The apparatus may also be provided with a shield 10 and means for producing air draughts 11 adapted to control the passage of the mixture from the rotor 5 to the belt 6.

The dough-like mixture leaving the mixer is fed onto the conveyor 1 as lumps which are preferably distributed evenly, either by hand or mechanically, so that the feed rate to the hopper 2 is more or less constant. The rollers 3,4, at the bottom of the hopper feed the dough-like mixture downwardly onto rotor 5. Rollers 3,4 may be smooth or one or both may be provided with teeth. The mixture fed downwardly by rollers 3,4 is brought into contact with the rotor 5, the teeth of which tear at and fluff out the dense dough-like mixture. Rotor 5 may be made of steel and the teeth are suitably of one-fourth inch diameter and set apart at ½ inch intervals either in irregular or regular fashion. The speed of rotation of rotor 5 is generally much higher than that of rollers 3,4 in order to provide the necessary tearing action; suitable speeds of the order of 1,000 revolutions per minute or even higher. The action of the rotor is to produce a fluffy mass from the dough-like mixture in which the fibers and finely divided inorganic material are coated with resin. The distance of the knife blade 9 from the rotor 5 can be adjusted to control the tearing action of the rotor 5. By this means it is possible to avoid having large lumps of dough-like material torn off by the rotor and incorporated in the fluffed-out mass. The fluffy mixture is flung off the rotor and collected in the form of a thick fibrous blanket, e.g. 2 inches thick, on the endless belt 6 which delivers it to the compacting nip rollers 7,8 which are set apart to give the desired thickness, for example one-half inch, in the final sheet. The passage of the fluffed-out mass from the rotor 5 to the belt 6 may be controlled by the shield 10 and air draughts 11. By this means the layering of the mixture in the nip rollers 7,8 can be improved and the strength of the final product increased. The air draughts, together with the shield form a cushion of air onto which the fluffed-out mixture falls.

The alternative tearing apparatus, shown in FIG. 2, consists of a chamber 20 in which are positioned a series of eight rotatable toothed shafts and disposed horizontally in three planes, two rotors, 21 in the highest plane, and three 22,23, in the other two planes. The chamber 20, has a neck piece 24 at its top, adapted to receive the mix from, for example, a conveyor, (not shown) and a skirt, 25, at its base. The skirt 25 is flexible and finishes just above the conveying means (not shown).

The mix or mixes enter the neck of the tearing apparatus and fall under the influence of gravity onto the toothed shafts, 21,22,23, which are rotating at a velocity of the order of 750 r.p.m. The direction of rotation is in each case marked by the arrows on FIG. 2.

The disintegrated, or kibbled, mix is flung from the toothed shafts, 21, 22, 23, and descends down the chamber until it contacts the conveying means. The adjustable skirt 25 may be so shaped that, as the mix abuts against it during layering, it falls back on itself and builds up a slight excess of material along the edges of the conveying means. This excess can be caused to compensate for the squashing out of the material at the edges during the subsequent compaction.

The sheet obtained from the nip rollers is even in thickness and the fibers in it are well oriented. It may be handled quite easily as it is fairly dry to the touch. Thus, before it is moulded and finally hardened it may be cut, trimmed, folded or worked more easily than would be the case with sheets having high resin contents which would be sticky to the touch. The sheets may be partially cured in order to reduce the time spent on the moulding cycle by passing them through continuous ovens or by providing some source of heat at some stage in their preparation.

The preparation of a moulding material of this invention is illustrated in Example 1 below.

EXAMPLE 1

A dough is prepared containing 17 percent by weight polyester resin, 5 percent by weight glass fibers and 78 percent by weight of quarry dust, and mixed thoroughly in a mixer of the type conventionally employed in premix technology, e.g. a spiral blade mixer. The mixed dough is then transferred to a board and passed repeatedly through rollers until it has been rolled out into a thin sheet. The resulting sheet is then wrapped around a mandrel and cured by the application of heat and/or pressure when using epoxy resins only very low moulding pressures, e.g. 20 p.s.i. are needed to yield very strong products.

A 9 inch square sheet one-fourth inch thick prepared by this procedure was compared with a sheet of the same dimensions formed by straightforward moulding of the same dough, and it was found that the rolled out sheet was 30 percent stronger. Moreover, the rolled out sheet showed a 40 percent improvement in strength and 300 percent improvement in water repellancy when compared with a sample of conventional asbestos sheeting of the same dimensions.

The following are examples of suitable formulations for making up into the moulding materials of the invention.

EXAMPLE 2

| Ingredient | Parts by weight |
| --- | --- |
| Polyester resin (F.149 Resinous Chemicals Ltd.) | 25 |
| Quartz dust (325 mesh) | 58.9 |
| Glass fibers | 15 |
| Benzoyl peroxide catalyst | 0.6 |
| Aluminum stearate | 0.5 |

This mixture can be made into objects of high strength. The quartz dust can be replaced by other fillers, for example limestone or granite dusts. By using less absorbent fillers and by using coarser meshes the resin content can be reduced.

EXAMPLE 3

| Ingredient | Parts by weight |
| --- | --- |
| Polyester resin | 25 |
| Granite dust (44 mesh) | 64 |
| Glass fibers (½ inch chopped strands) | 10 |
| Benzoyl peroxide | 0.5 |
| Aluminum stearate | 0.5 |

This composition is suitable for use in the production of corrugated building panels (e.g. 8 by 4 feet) for roofing or wall cladding.

EXAMPLE 4

| Ingredient | Parts by weight |
| --- | --- |
| Polyester resin | 17 |
| Quartz dust | 71.7 |
| Glass fibers | 10 |
| t-Butyl perbenzoate | 0.5 |
| Aluminum stearate | 0.5 |
| Brick dust | 0.25 |
| Coal dust | 0.25 |

This composition is suitable for producing decorative stone effects and can be formed into such products as bath tubs, panels and fireplace surrounds.

EXAMPLE 5

| Ingredient | Parts by weight |
| --- | --- |
| Polyester resin | 22 |
| Granite dust (44 mesh) | 69.2 |
| Sisal fibers (½ inch strands) | 6.8 |
| Benzoyl peroxide (50% paste in D.M.P.) | 1.0 |
| Zinc stearate | 1.0 |

It is believed that the greater strength of the products of the present invention arises from the orientation of the fibers in one plane within the compacted sheet before moulding, in contrast to the random orientation produced by conventional dough moulding procedures, and from the removal of air spaces, both of these features arising directly from the compacting operation. The moulding materials of the invention are characterized by an even weight distribution of the fibers throughout, so that each gram of material taken randomly contains substantially the same weight of fibers.

I claim:
1. A process for the production of a sheet that can be hardened to form a molded article which has high strength in the hardened condition, comprising the steps of
    a. homogeneously mixing, by weight of the whole,
        1. from 14 to 24 percent of a hardenable resin,
        2. from 62 to 81 percent of finely divided mineral filler, and
        3. from 5 to 14 percent of inorganic fibrous material, to form a tearable non-flowable mixture of dough-like consistency,
    b. conveying the tearable non-flowable mixture to a tearing means,
    c. tearing the mixture to a fluffy mass,
    d. depositing the fluffy mass on a conveying means, and
    e. removing occluded air from said fluffy mass by compacting said fluffy mass and forming said fluffy mass into a sheet in which substantially all the fibers lie in the plane of the sheet but in random directions.
2. A process as claimed in claim 1, in which said resin is a thermosetting resin.
3. A process as claimed in claim 1, and hardening said sheet.
4. A process as claimed in claim 3, in which said hardening is effected under pressure.

* * * * *